US012397569B2

(12) United States Patent
Fujiwara et al.

(10) Patent No.: US 12,397,569 B2
(45) Date of Patent: Aug. 26, 2025

(54) WINDING DEVICE AND PRINTING DEVICE WITH A MOVEABLE ARM

(71) Applicant: SEIKO EPSON CORPORATION, Tokyo (JP)

(72) Inventors: Daisuke Fujiwara, Matsumoto (JP); Satoshi Fujioka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/338,803

(22) Filed: Jun. 21, 2023

(65) Prior Publication Data

US 2023/0415502 A1 Dec. 28, 2023

(30) Foreign Application Priority Data

Jun. 23, 2022 (JP) ................................ 2022-100900

(51) Int. Cl.

| | |
|---|---|
| ***B41J 15/16*** | (2006.01) |
| ***B41F 17/00*** | (2006.01) |
| ***B65H 18/26*** | (2006.01) |
| ***B65H 20/02*** | (2006.01) |
| ***B65H 23/00*** | (2006.01) |
| ***B65H 23/26*** | (2006.01) |
| *B65H 18/10* | (2006.01) |

(52) U.S. Cl.

CPC ............... *B41J 15/16* (2013.01); *B41F 17/00* (2013.01); *B65H 18/26* (2013.01); *B65H 20/02* (2013.01); *B65H 23/00* (2013.01); *B65H 23/26* (2013.01); *B65H 18/103* (2013.01)

(58) Field of Classification Search

CPC .......... B41J 15/16; B41F 17/00; B65H 18/26; B65H 20/02; B65H 23/00; B65H 23/26; B65H 18/103

See application file for complete search history.

(56) References Cited

U.S. PATENT DOCUMENTS

| | | | | |
|---|---|---|---|---|
| 5,850,982 A * | 12/1998 | Roth | D04B 27/34 | 242/535 |
| 2009/0236463 A1* | 9/2009 | Izumida | B65H 23/038 | 242/547 |
| 2014/0231572 A1* | 8/2014 | Izawa | B65H 18/10 | 242/547 |
| 2018/0104969 A1 | 4/2018 | Nakata | | |
| 2022/0410601 A1* | 12/2022 | Shibata | B41J 15/165 | |

FOREIGN PATENT DOCUMENTS

JP 2018-065657 A 4/2018

* cited by examiner

*Primary Examiner* — Henok D Legesse

(74) *Attorney, Agent, or Firm* — WORKMAN NYDEGGER

(57) ABSTRACT

A winding unit includes a winding roller configured to wind up an elongated medium M that was transported, a cylindrical pressing member that extends along a rotation shaft of the winding roller and that is configured to press the medium M toward the winding roller at a position where the medium M is wound by the winding roller, a cylindrical winding guide member that extends along the rotation shaft of the winding roller, that has a fixed position with respect to the winding roller, and that is configured to guide the medium M to the winding roller before the medium is wound up by the winding roller, and arms that extend in a direction intersecting an extension direction of the pressing member and that are configured to support the pressing member, wherein the arms are configured to pivot about a central shaft of the winding guide member.

6 Claims, 10 Drawing Sheets

WINDING DEVICE AND PRINTING DEVICE WITH A MOVEABLE ARM

The present application is based on, and claims priority from JP Application Serial Number 2022-100900, filed Jun. 23, 2022, the disclosure of which is hereby incorporated by reference herein in its entirety.

BACKGROUND

1. Technical Field

The present disclosure relates to a winding device and a printing device.

2. Related Art

A winding device configured to wind an elongated medium to be transported on a winding roller was known. In such a winding device, when the medium is wound around the winding roller, air enters between layers of the medium, and frictional force between the layers decreases, so that there is a possibility of occurrence of winding slippage. The winding device described in JP-A-2018-65657 includes a pressing section that presses the medium to be wound against the winding roller, thereby suppressing the entrance of air, that is, the occurrence of winding slippage.

On the other hand, if a pressing load with which the pressing section presses the medium is too strong, the medium may be wrinkled, so that it is desirable to keep the pressing load substantially constant. However, since the pressing load is affected by tension acting on the medium, it is difficult to keep the pressing load constant. Specifically, when winding of the medium progresses and a roll diameter changes, a transport direction of the medium toward the winding roller changes, so that the tension component that acts on the medium in a direction in which the pressing load acts also changes. In other words, in a related art configuration, there is a problem that the pressing load changes in accordance with progress of the winding.

SUMMARY

A winding device includes a winding roller configured to wind up an elongated medium that was transported; a pressing member that extends along a rotation shaft of the winding roller and that is configured to press the medium toward the winding roller at a position where the medium is wound by the winding roller; a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member.

A printing device includes a print head configured to print on an elongated medium; a winding roller configured to wind the medium after printing; a pressing member that extends along a rotation shaft of the winding roller and that is configured to press the medium toward the winding roller at a position where the medium is wound by the winding roller; a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member.

DESCRIPTION OF EMBODIMENTS

1. First Embodiment

A printer 10 according to a first embodiment will be described below.

Figure 1:
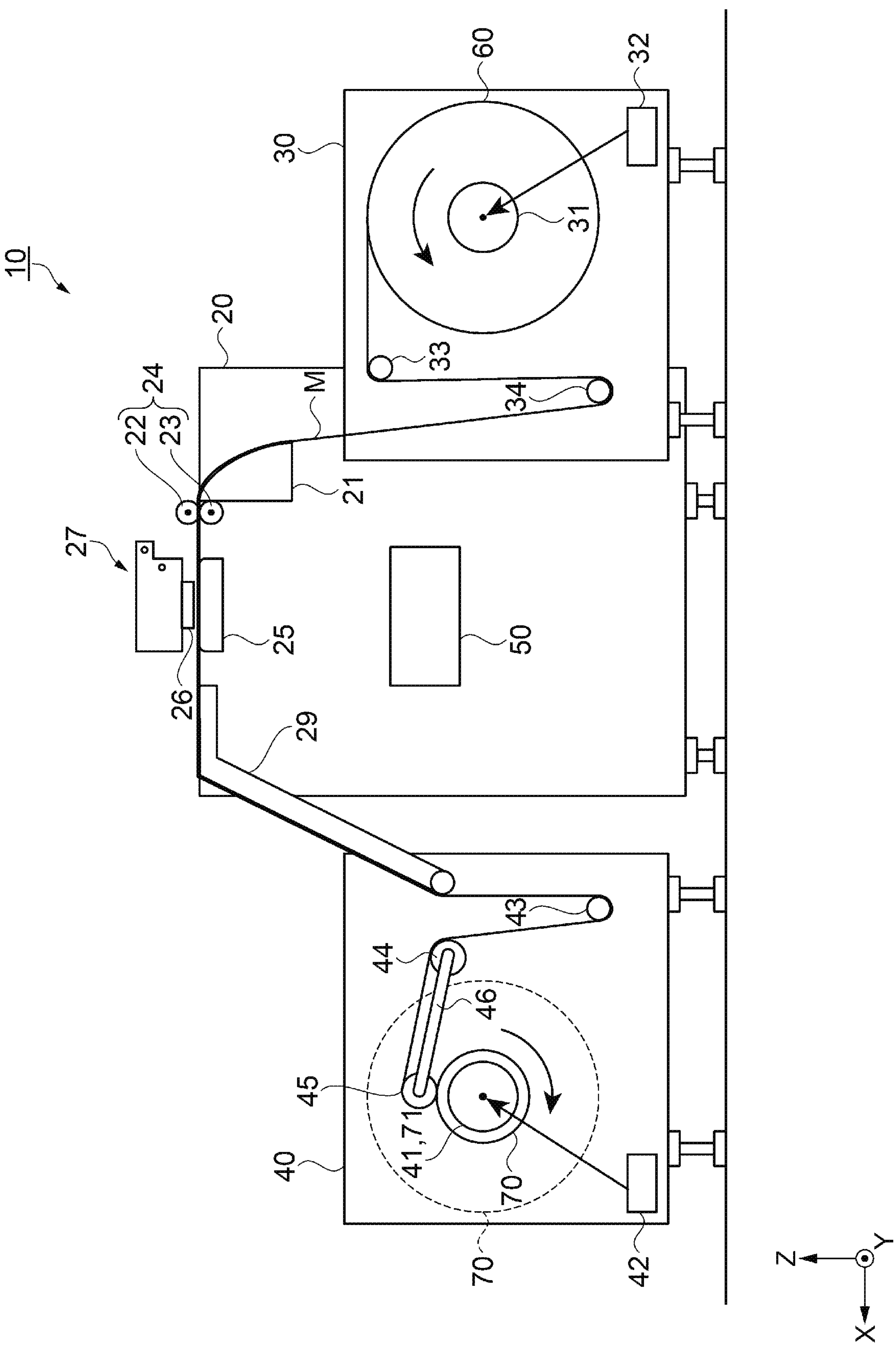
FIG. 1 is a schematic cross-sectional view showing configuration of a printer according to a first embodiment.

FIG. 1 is a schematic cross-sectional view showing configuration of a printer 10 according to the first embodiment.

As shown in FIG. 1, the printer 10 is an inkjet printer that performs printing by ejecting ink, which is liquid, onto a medium M. The printer 10 includes a printing unit 20, a supply unit 30 that feeds an elongated medium M to the printing unit 20, and a winding unit 40 that winds the medium M after printing. The printer 10 corresponds to a printing device, and the winding unit 40 corresponds to a winding device.

In each figure including FIG. 1, an X-axis, a Y-axis and a Z-axis orthogonal to each other are shown. The X-axis is parallel to an installation surface of the printer 10 and corresponds to a width direction of the printer 10. The Y-axis is parallel to the installation surface of the printer 10 and corresponds to a depth direction of the printer 10. The Z-axis is perpendicular to the installation surface of the printer 10 and corresponds to a height direction of the printer 10.

Hereinafter, a +X direction parallel to the X-axis is a direction from the supply unit 30 toward the winding unit 40. In a case of FIG. 1, the +X direction is a direction toward left in the figure. A −X direction parallel to the X-axis is a direction opposite to the +X direction. A +Y direction parallel to the Y-axis is a direction from a back toward a front of the printer 10 assuming that the winding unit 40 is disposed to the left with respect to the printing unit 20. In the case of FIG. 1, the +Y direction is a direction toward the front in the figure. A −Y direction parallel to the Y-axis is a direction opposite to the +Y direction. A +Z direction parallel to the Z-axis is a direction upward from the installation surface of the printer 10. In the case of FIG. 1, the +Z direction is an upward direction in the figure. A −Z direction parallel to the Z-axis is a direction opposite to the +Z direction.

The printing unit 20 includes a supply guide frame 21, a transport roller pair 24, a platen 25, a print head 26, a carriage 27, a discharge guide frame 29, and a control unit 50.

The supply guide frame 21 guides the medium M fed from the supply unit 30 to the transport roller pair 24. The supply guide frame 21 guides the medium M in an oblique direction having a +X component and a +Z component. The supply guide frame 21 may be formed of a single member or a plurality of members.

The transport roller pair 24 includes a first transport roller 22 and a second transport roller 23, and transports the medium M. The first transport roller 22 is disposed on the +Z side with respect to the medium M, and the second transport roller 23 is disposed on the −Z side with respect to the medium M. The first transport roller 22 or the second transport roller 23 is driven to rotate by a driving force from a drive device (not shown). The first transport roller 22 and the second transport roller 23 nip the medium M by being pressed against each other, and transport the medium M in the +X direction in which the print head 26 is positioned by rotational driving of one of the rollers.

The platen 25 is provided at a position in the −Z direction with respect to the print head 26. The platen 25 is a flat plate-shaped member that supports the medium M transported by the transport roller pair 24. A suction fan may be provided at a position in the −Z direction with respect to the platen 25. In this case, the platen 25 is provided with a through hole through which air flows, and the medium M is attracted to the platen 25 by air flow of the suction fan.

The print head 26 forms an image, that is, performs printing on the medium M supported by a platen 25. In the embodiment, the print head 26 is an inkjet head and forms the image by ejecting ink onto the medium M.

The carriage 27 supports the print head 26. The carriage 27 can reciprocate along the Y-axis. While the carriage 27 is moving over the medium M along the Y-axis, the print head 26 ejects ink onto the medium M, thereby forming the image along the Y-axis. And, by alternately repeating this operation and an operation of transporting the medium M by a predetermined amount in the +X direction, the image is formed over a wide range of the medium M.

The discharge guide frame 29 guides the medium M printed by the print head 26 to the winding unit 40. The discharge guide frame 29 guides the medium M in an oblique direction having a +X component and a −Z component. The discharge guide frame 29 may be formed of a single member or a plurality of members.

A drying unit may be provided at a position facing the discharge guide frame 29 with the medium M interposed therebetween. The drying unit includes, for example, a heater as a heating source. The drying unit heats the medium M on the discharge guide frame 29 and promotes fixing of the ejected ink to the medium M.

The control unit 50 performs various types of control such as control of transport of the medium M and control of printing on the medium M. The control unit 50 includes a central processing unit (CPU), a read only memory (ROM), a random access memory (RAM), and a storage (none of which are shown). The control unit 50 acquires print data from an external computer (not shown) or the like and performs various controls based on the acquired print data. The control unit 50 may be composed of one or a plurality of units.

The supply unit 30 includes a feed roller 31, a supply drive section 32, a supply guide member 33, and a supply bar member 34. A medium roll 60 around which the elongated medium M is wound in a roll shape is attached to the supply unit 30.

The feed roller 31 extends along the Y-axis and supports the medium roll 60. The feed roller 31 is rotatably supported by a frame (not shown) or the like disposed at an end section in the +Y direction and an end section in the −Y direction of the supply unit 30. The medium roll 60 rotates as the feed roller 31 rotates. The medium M is fed out outside by rotating the medium roll 60 counterclockwise with respect to the side view of FIG. 1.

The supply drive section 32 rotates the feed roller 31 under control of the control unit 50. The supply drive section 32 includes a drive source such as a motor (not shown), a transmission mechanism (not shown) for transmitting a driving force from the drive source, and a control circuit (not shown) for operating the drive source based on a signal from the control unit 50.

The supply guide member 33 and the supply bar member 34 extend along the Y-axis similarly to the feed roller 31. That is, the supply guide member 33 and the supply bar member 34 extend along the rotation shaft of the feed roller 31. Specifically, the supply guide member 33 and the supply bar member 34 are parallel to the rotation shaft of the feed roller 31.

The medium M fed out from the medium roll 60 is wound around the supply guide member 33. The supply guide member 33 guides a wound medium M substantially in the −Z direction. The supply guide member 33 is, for example, a cylindrical member. The supply guide member 33 may be rotatably supported by a frame (not shown) or the like, or may be non-rotatably supported.

The medium M which is guided and transported by the supply guide member 33 is wound around the supply bar member 34, and tension is applied to the medium M. The supply bar member 34 is disposed between the feed roller 31 and the transport roller pair 24 in a transport path along which the medium M is transported. The supply bar member 34 guides the medium M substantially in the +Z direction so that the wound medium M is transported to the transport roller pair 24 via the supply guide frame 21. The supply bar member 34 is in contact with the medium M directly or via a cover member (not shown). In other words, the supply bar member 34 directly or indirectly contacts the medium M. The supply bar member 34 applies tension to the medium M by its own weight or by action of a tension applying mechanism (not shown). The shape of the supply bar member 34 is not limited as long as it is possible to apply tension to the medium M, but the shape thereof is desirably a cylindrical shape.

The winding unit 40 includes a winding roller 41, a winding drive section 42, a winding bar member 43, a winding guide member 44, a pressing member 45 and arms 46. The winding unit 40 winds the medium M transported from the printing unit 20, that is, the medium M printed by the printing unit 20.

Figure 2:
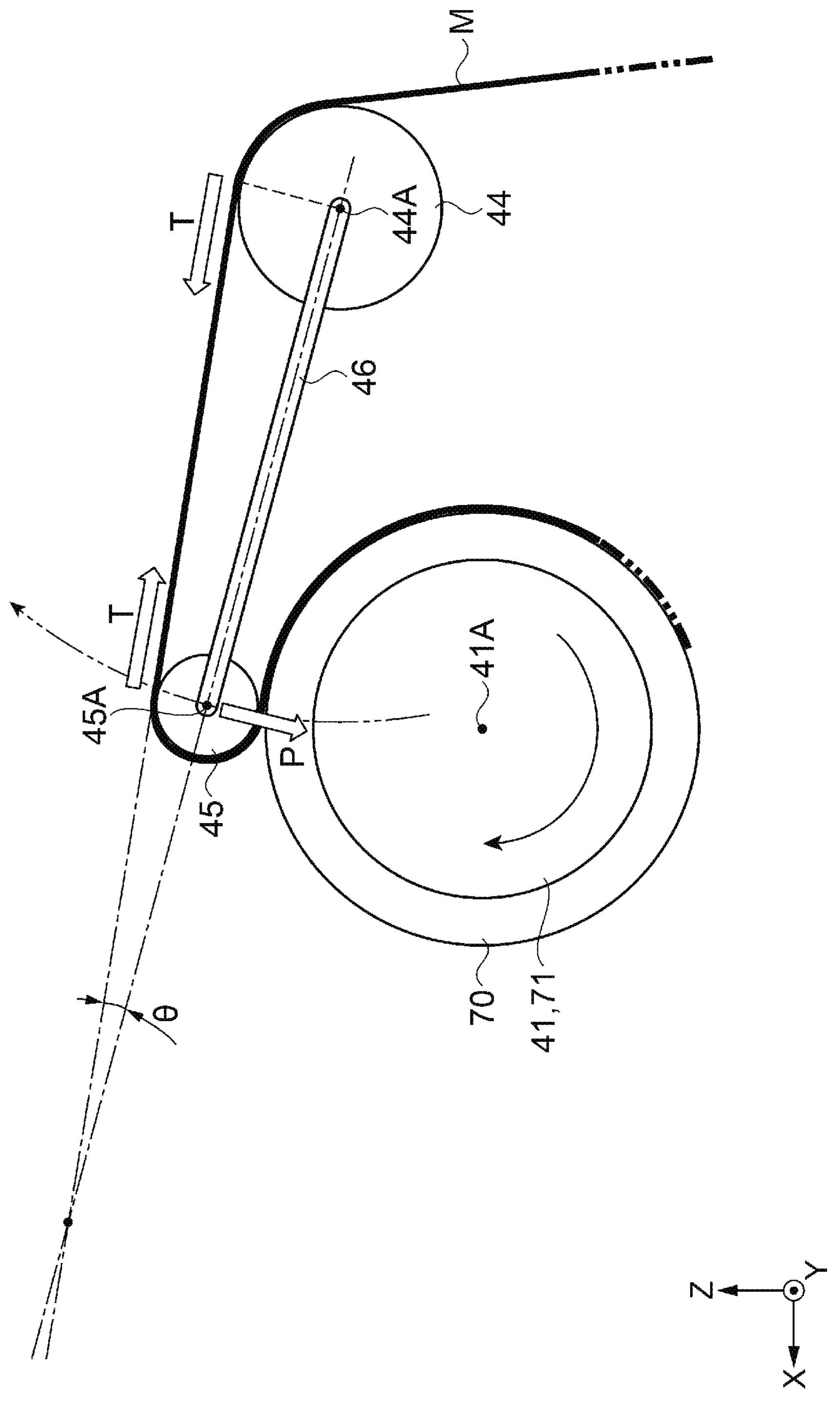
FIG. 2 is an enlarged side view showing a part of a winding unit according to the first embodiment.
Figure 3:
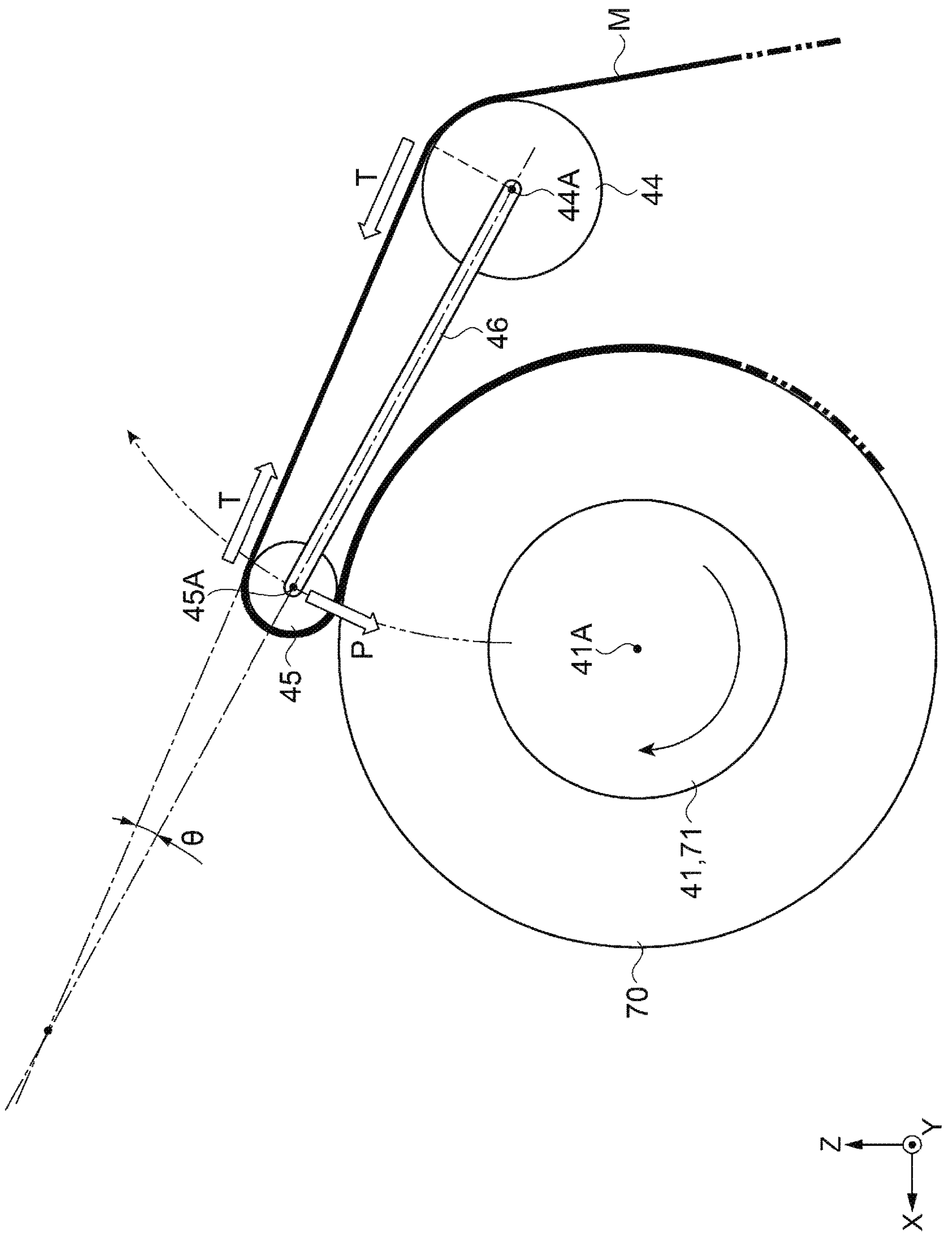
FIG. 3 is an enlarged side view showing the part of the winding unit according to the first embodiment.

FIGS. 2 and 3 are enlarged side views showing a part of the winding unit 40 according to the first embodiment, and FIG. 3 shows a state in which winding has progressed more than a state shown in FIG. 2. Hereinafter, the winding unit 40 will be described with reference to FIGS. 1 to 3.

The winding roller 41 is a cylindrical roller extending along the Y-axis, and winds the transported, printed-on medium M around a roll core 71 mounted on the winding roller 41. The winding roller 41 is provided downstream of the transport roller pair 24 in the transport direction of the medium M. The winding roller 41 is rotatable about a rotation shaft 41A along the Y-axis, and winds the medium M printed by the printing unit 20 around the roll core 71 by rotating clockwise with respect to the side views of FIGS. 1 to 3. The medium M wound around the roll core 71 becomes a print medium roll 70 in a roll shape, and as the winding progresses, the roll diameter, that is, the diameter of the print medium roll 70 increases. The print medium roll 70 shown in broken line in FIG. 1 shows a state in which the entire medium M is wound. The winding roller 41 is rotatably supported by a frame (not shown) or the like disposed at an end section in the +Y direction and an end section in the −Y direction of the winding unit 40. It should be noted that configuration is not limited to winding the medium M around the roll core 71, but may be configuration in which the medium M is directly wound around the winding roller 41.

The winding drive section 42 rotates the winding roller 41 under the control of the control unit 50. The winding drive section 42 includes a drive source such as a motor (not shown), a transmission mechanism that transmits a driving force from the drive source (not shown), and a control circuit (not shown) that operates the drive source based on a signal from the control unit 50. The winding drive section 42 causes the winding roller 41 to wind the medium M by rotating the winding roller 41.

Similarly to the winding roller 41, the winding bar member 43, the winding guide member 44, and the pressing member 45 extend along the Y-axis. That is, the winding bar member 43, the winding guide member 44, and the pressing member 45 extend along the rotation shaft 41A of the winding roller 41. Specifically, the winding bar member 43, the winding guide member 44, and the pressing member 45 are parallel to the rotation shaft 41A of the winding roller 41. The winding bar member 43, the winding guide member 44, and the pressing member 45 may be configured by an extruded member or a pipe processed member formed by using a metal material such as aluminum or SUS, for example, but may be configured by an elastic member so as to be in contact with the medium M without a gap.

The medium M printed by the print head 26 is wound around the winding bar member 43. The winding bar member 43 is disposed between the transport roller pair 24 and the winding roller 41 in the transport path along which the medium M is transported, and guides the medium M substantially in the +Z direction. The winding bar member 43 is in contact with a print surface directly or via a cover member (not shown). In other words, the winding bar member 43 directly or indirectly contacts the print surface. The winding bar member 43 applies tension to the medium M by its own weight or by an action of a tension applying mechanism (not shown). The shape of the winding bar member 43 is not limited as long as it is possible to apply tension to the medium M, but the shape thereof is desirably a cylindrical shape.

The medium M that has passed by the winding bar member 43 and that has not yet been wound around the winding roller 41 winds around the winding guide member 44. The position of the winding guide member 44 is fixed with respect to the winding roller 41, and the winding guide member 44 guides the wound medium M to the winding roller 41 via the pressing member 45. The winding guide member 44 is in contact with a back surface of the medium M, that is, the surface opposite to the print surface, directly or via a cover member (not shown). In other words, the winding guide member 44 is directly or indirectly in contact with the back surface of the medium M. The winding guide member 44 is, for example, a cylindrical member. The winding guide member 44 may be rotatably supported by a frame (not shown) or the like, or may be non-rotatably supported. The winding guide member 44 corresponds to a guide shaft member.

The medium M having passed by the winding guide member 44 winds around the pressing member 45. The pressing member 45 is disposed on the +Z side of the print medium roll 70, and is in contact with the back surface of the medium M directly or via a cover member (not shown). In other words, the pressing member 45 is directly or indirectly in contact with the back surface of the medium M. The pressing member 45 is, for example, a cylindrical member.

The medium M that has wound around the pressing member 45 passes between the pressing member 45 and the print medium roll 70 and is wound up on the print medium roll 70. At this time, the medium M is wound so that the print surface thereof faces inward. The pressing member 45 presses the medium M that passes between the pressing member 45 and the print medium roll 70 against the print medium roll 70. In other words, the pressing member 45 presses the medium M toward the winding roller 41 at a position where the medium M is wound up by the winding roller 41. In other words, the medium M is wound onto the print medium roll 70 while being pressed by the pressing member 45. Therefore, air is suppressed from entering between layers of the medium M at the time of winding. It is to be noted that the pressing member 45 may press the medium M by its own weight alone, or may press the medium M by using a biasing force of a fixed magnitude applied by a biasing mechanism (not shown).

The pressing member 45 is supported by the arms 46 so as to be rotatable or non-rotatable about a central shaft 45A. The arms 46 are disposed on both sides of the pressing member 45 in the ±Y direction, that is, on the +Y side and on the −Y side of the pressing member 45, and extend in a direction that intersects an extension direction of the pressing member 45, specifically, in a direction that is perpendicular to the extension direction of the pressing member 45. One end of each arm 46 is connected to the central shaft 45A of the pressing member 45, and the other end of each arm 46 is connected to the central shaft 44A of the winding guide member 44. The arms 46 are pivotable about the central shaft 44A of the winding guide member 44. In other words, the arms 46 are pivotable about the central shaft 44A as a rotation shaft. Therefore, the arms 46 and the pressing member 45, which is connected to one end of each arm 46, pivot clockwise in the side views of FIGS. 1 to 3 as winding of the medium M progresses and the roll diameter of the print medium roll 70 increases.

Here, force by which the pressing member 45 presses the medium M is defined as the pressing load P, and a pressing direction, that is, a direction in which the pressing load P acts, is defined as a direction perpendicular to an extension direction of the arms 46 with respect to the side views of FIGS. 1 to 3, that is, a direction perpendicular to an imaginary straight line passing through the central shaft 44A of the winding guide member 44 and the central shaft 45A of the pressing member 45. Further, a component in the pressing direction of the tension acting on the medium M is denoted by $T \sin \theta$, wherein the tension acting on the medium M from the winding guide member 44 toward the pressing member 45 is denoted by T, and an angle formed by the extension direction of the arms 46 and the transport direction of the medium M from the winding guide member 44 toward the pressing member 45 is denoted by $\theta$.

As described above, in the embodiment, since the arms 46 supporting the pressing member 45 are pivotable about the central shaft 44A of the winding guide member 44, the angle θ formed by the extension direction of the arms 46 and the transport direction of the medium M from the winding guide member 44 toward the pressing member 45 is substantially constant even when winding progresses and the roll diameter of the printing medium roll 70 changes. Therefore, among the tension acting on the medium M, a component in the pressing direction, that is, a component affecting the pressing load P is substantially constant regardless of the roll diameter of the printing medium roll 70. As a result, the pressing load P becomes substantially constant, and a change in the pressing load P due to a change in the roll diameter is suppressed.

2. Second Embodiment

Next, a printer 10 according to a second embodiment will be described.

In the printer 10 of the second embodiment, a part of a configuration of the winding unit 40 is different from that of the first embodiment, but the other configurations are common to those of the first embodiment, and thus the description thereof will be omitted.

Figure 4:
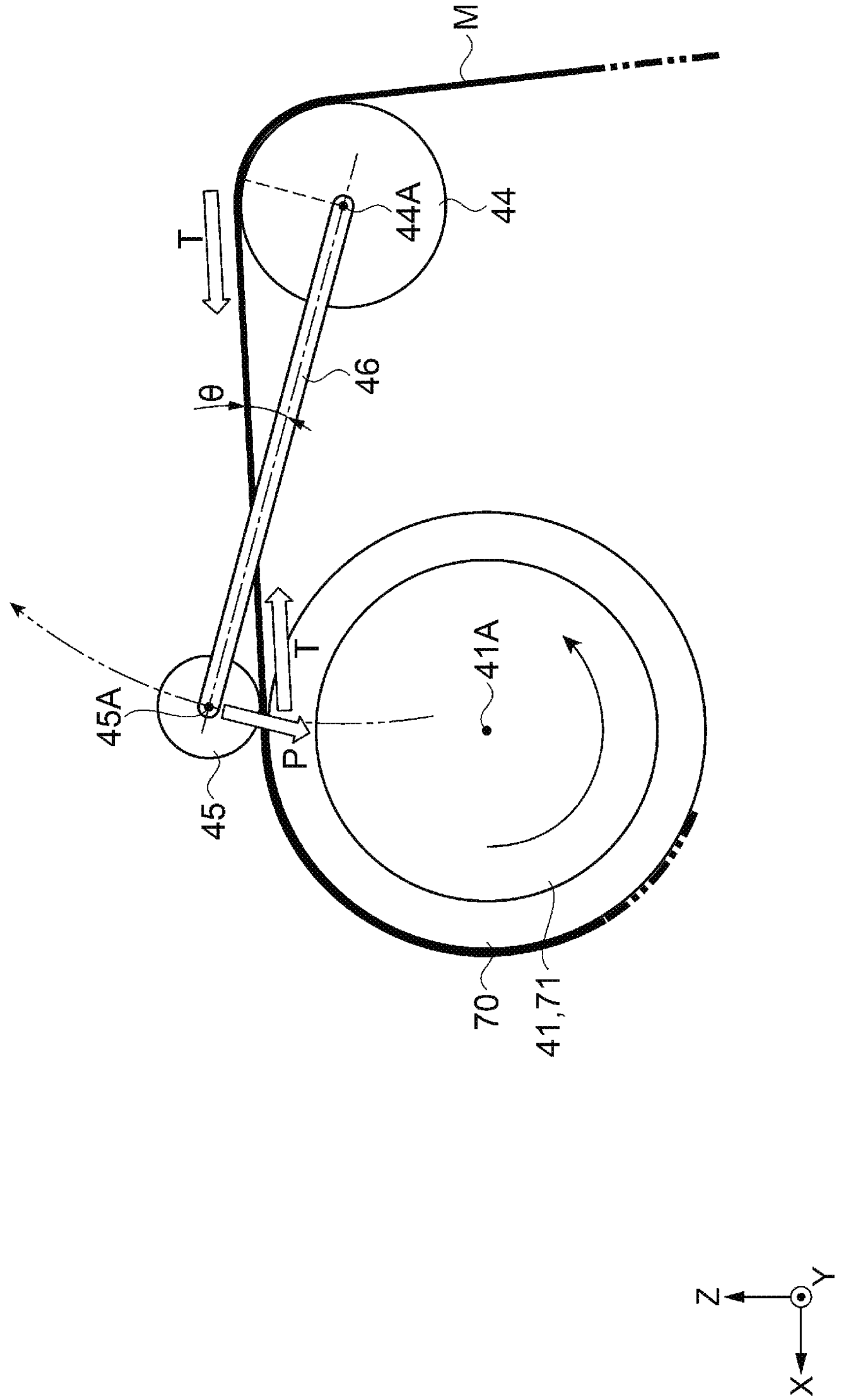
FIG. 4 is an enlarged side view showing a part of the winding unit according to a second embodiment.
Figure 5:
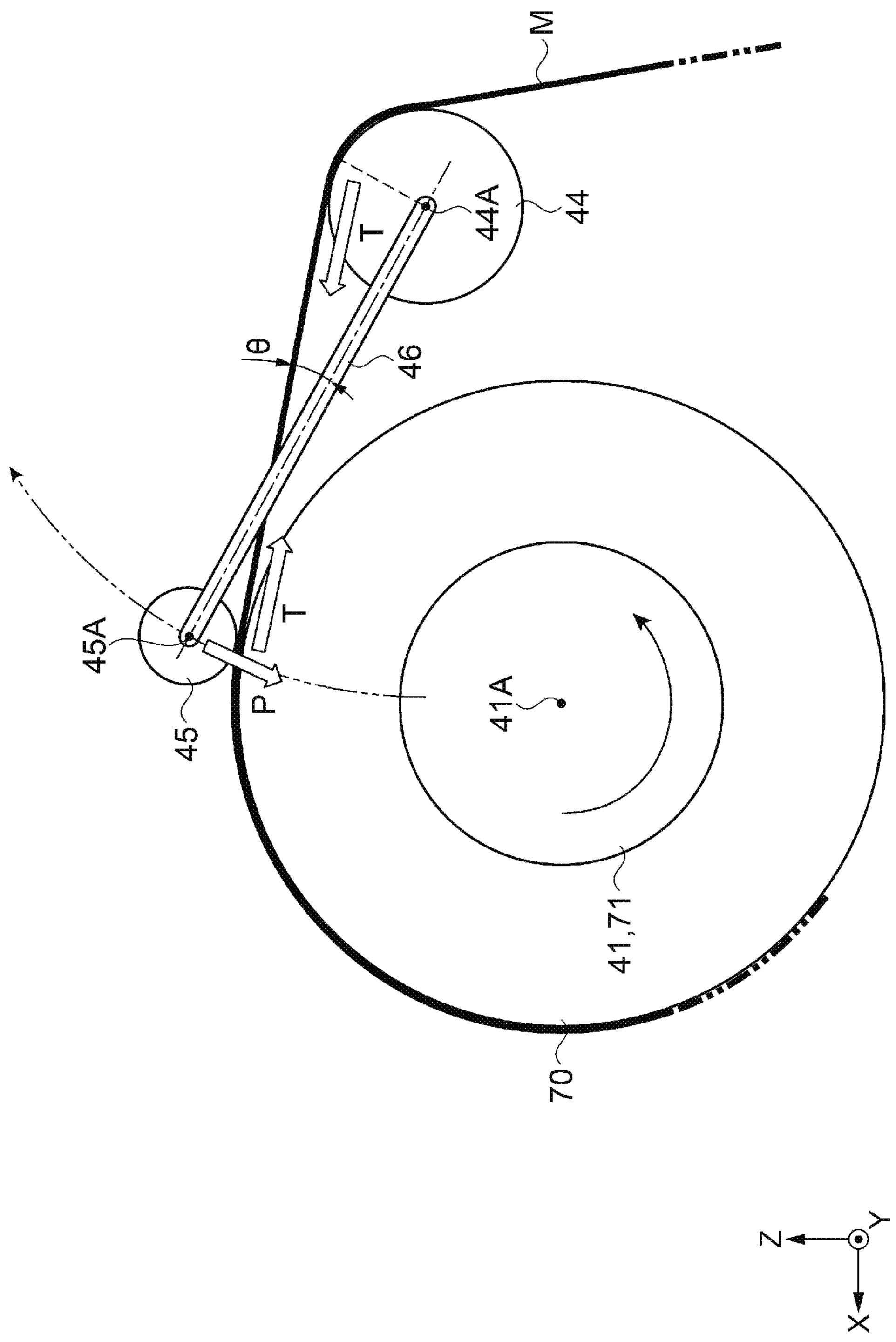
FIG. 5 is an enlarged side view showing the part of the winding unit according to the second embodiment.

FIGS. 4 and 5 are enlarged side views showing a part of the winding unit 40 according to a second embodiment, and FIG. 5 shows a state in which the winding has progressed more than a state shown in FIG. 4.

As shown in FIGS. 4 and 5, in the present embodiment, the medium M that has passed through the winding guide member 44 is wound up on the winding roller 41 without winding around the pressing member 45. Therefore, in the present embodiment, the medium M is wound around the roll core 71 by the winding roller 41 rotating counterclockwise in the side views of FIGS. 4 and 5, so that the print surface faces outward. The pressing member 45 is disposed on the +Z side of the print medium roll 70, and is in contact with the print surface of the medium M directly or via a cover member (not shown). The pressing member 45 is, for example, a cylindrical member.

The pressing member 45 presses the medium M that passes between the pressing member 45 and the print medium roll 70 against the print medium roll 70. In other words, the pressing member 45 presses the medium M toward the winding roller 41 at a position where the medium M is wound up by the winding roller 41. In other words, the medium M is wound onto the print medium roll 70 while being pressed by the pressing member 45. Therefore, air is suppressed from entering between layers of the medium M at the time of winding. It is to be noted that the pressing member 45 may press the medium M by its own weight alone, or may press the medium M by using a biasing force of a fixed magnitude applied by a biasing mechanism (not shown).

Similarly to the first embodiment, the pressing member 45 is supported by the arms 46 so as to be rotatable or non-rotatable about the central shaft 45A, one end of each arm 46 is connected to the central shaft 45A of the pressing member 45, and the other end of each arm 46 is connected to the central shaft 44A of the winding guide member 44. The arms 46 are pivotable about the central shaft 44A of the winding guide member 44. Therefore, the arms 46 and the pressing member 45, which is connected to one end of each arm 46, pivot clockwise with respect to the side views of FIGS. 4 and 5 as winding of the medium M progresses and the roll diameter of the printing medium roll 70 increases.

Also in the embodiment, since the arms 46 supporting the pressing member 45 are pivotable about the central shaft 44A of the winding guide member 44, the angle θ formed by the extension direction of the arms 46 and the transport direction of the medium M from the winding guide member 44 toward the winding roller 41 is substantially constant even when the winding progresses and the roll diameter of the print medium roll 70 changes. Therefore, T sin θ, which is a component in the pressing direction of the tension acting on the medium M, is substantially constant. As a result, the pressing load P becomes substantially constant regardless of the roll diameter of the print medium roll 70, and it is possible to suppress a change in the pressing load P caused by a change in the roll diameter.

3. First Modification

The winding unit 40 according to a first modification has the same configuration as that of the second embodiment, but differs from the second embodiment in the form of the pressing member 45.

Figure 6:
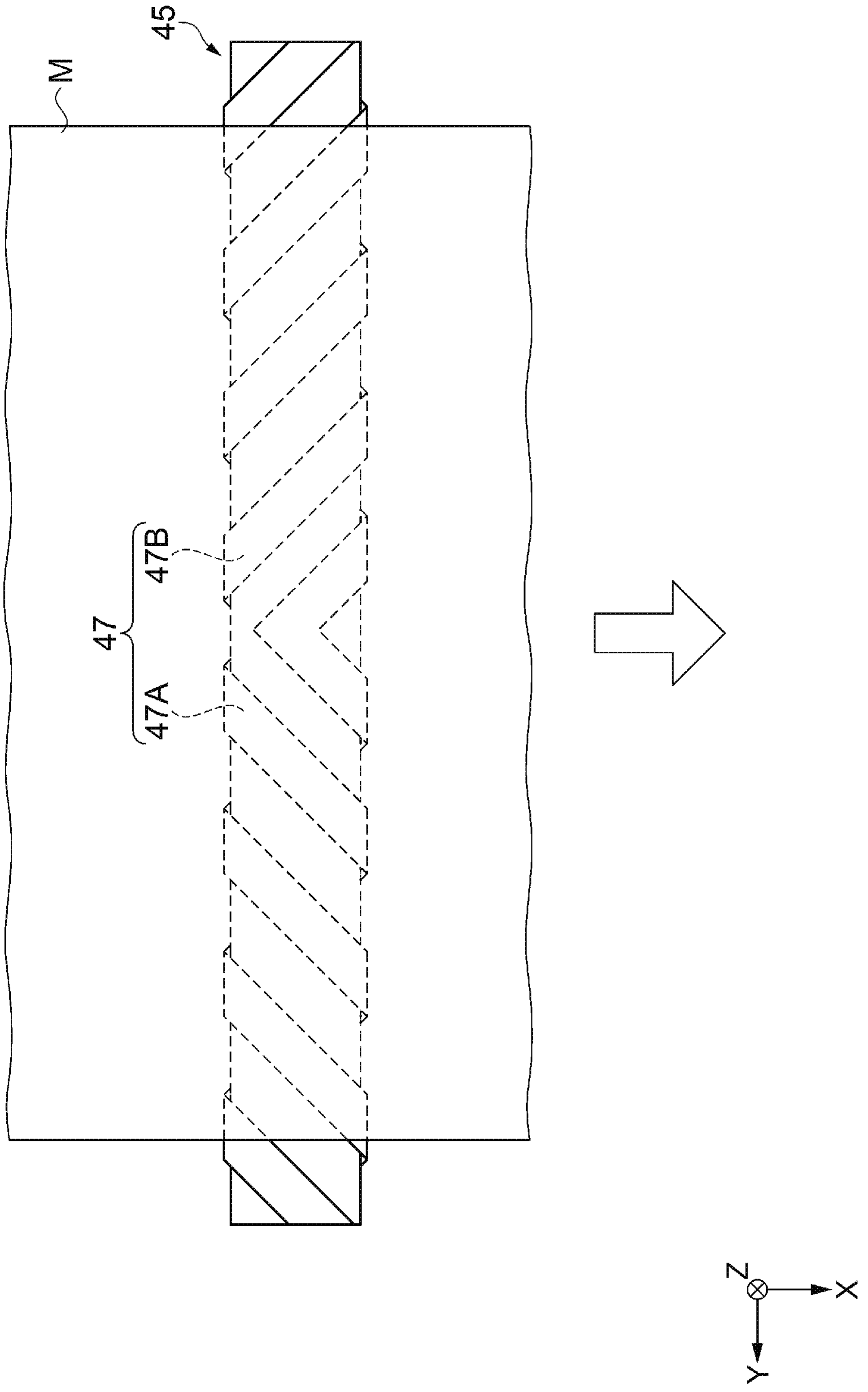
FIG. 6 is a plan view showing a pressing member according to a first modification.

FIG. 6 is a plan view showing the pressing member 45 according to the first modification, and is a perspective view of the pressing member 45 in the +Z direction. In FIG. 6, the transport direction of the medium M pressed by the pressing member 45 is indicated by an arrow. In the first modification, the pressing member 45 is not rotatable about the central shaft 45A thereof, and the medium M is transported so as to slide on the outer peripheral surface of the pressing member 45 that does not rotate.

As shown in FIG. 6, the pressing member 45 has a cylindrical shape, and a ridge 47 projecting linearly is formed in a spiral shape on an outer peripheral surface thereof. Specifically, on the outer peripheral surface of the pressing member 45, a first ridge 47A is formed on a +Y side from substantial center in ±Y direction, which is the axial direction of the pressing member 45, and a second ridge 47B is formed on a −Y side from the substantial center. With respect to the portion of the outer peripheral surface of the pressing member 45 that is on the side in contact with the medium M, the first ridge 47A extends in the +Y direction towards downstream in the transport direction of the medium M, and the second ridge 47B extends in the −Y direction toward the downstream in the transport direction of the medium M. In other words, an interval between the first ridge 47A and the second ridge 47B at an arbitrary position on the outer peripheral surface of the pressing member 45 is smaller than an interval between the first ridge 47A and the second ridge 47B at a position downstream of the arbitrary position in the transport direction of the medium M. The +Y side corresponds to one side in the axial direction, and the −Y side corresponds to the other side in the axial direction.

According to the winding unit 40, which includes the pressing member 45 described above, in a process in which the medium M is transported to the downstream while being pressed by the pressing member 45, tension is generated on the medium M in a direction in which the ridges 47 extend due to friction with the ridges 47. Since the first ridge 47A formed on the +Y side extends downstream in the +Y direction, and the second ridge 47B formed on the −Y side extends downstream in the −Y direction, the medium M is transported while being pressed by the pressing member 45, and thus tension toward both sides from the substantial center in the ±Y direction is generated in the medium M. Therefore, it is possible to suppress generation of wrinkles in the medium M, and in a case where wrinkles are generated, it is possible to correct the wrinkles.

In the above description, a configuration in which the pressing member 45 is not rotatable about the central shaft 45A has been described, but it may be configured to rotate following transport of the medium M. The pressing member 45 according to the first modification may be applied to the winding unit 40 according to the first embodiment. In the first embodiment, since a contact area between the medium M and the pressing member 45 is larger than that in the second embodiment, it is possible to obtain a greater effect.

4. Second Modification

The winding unit 40 according to a second modification has the same configuration as that of the first embodiment, but a limitation is added to a ratio between the diameter of the winding guide member 44 and the diameter of the pressing member 45.

Figure 7:
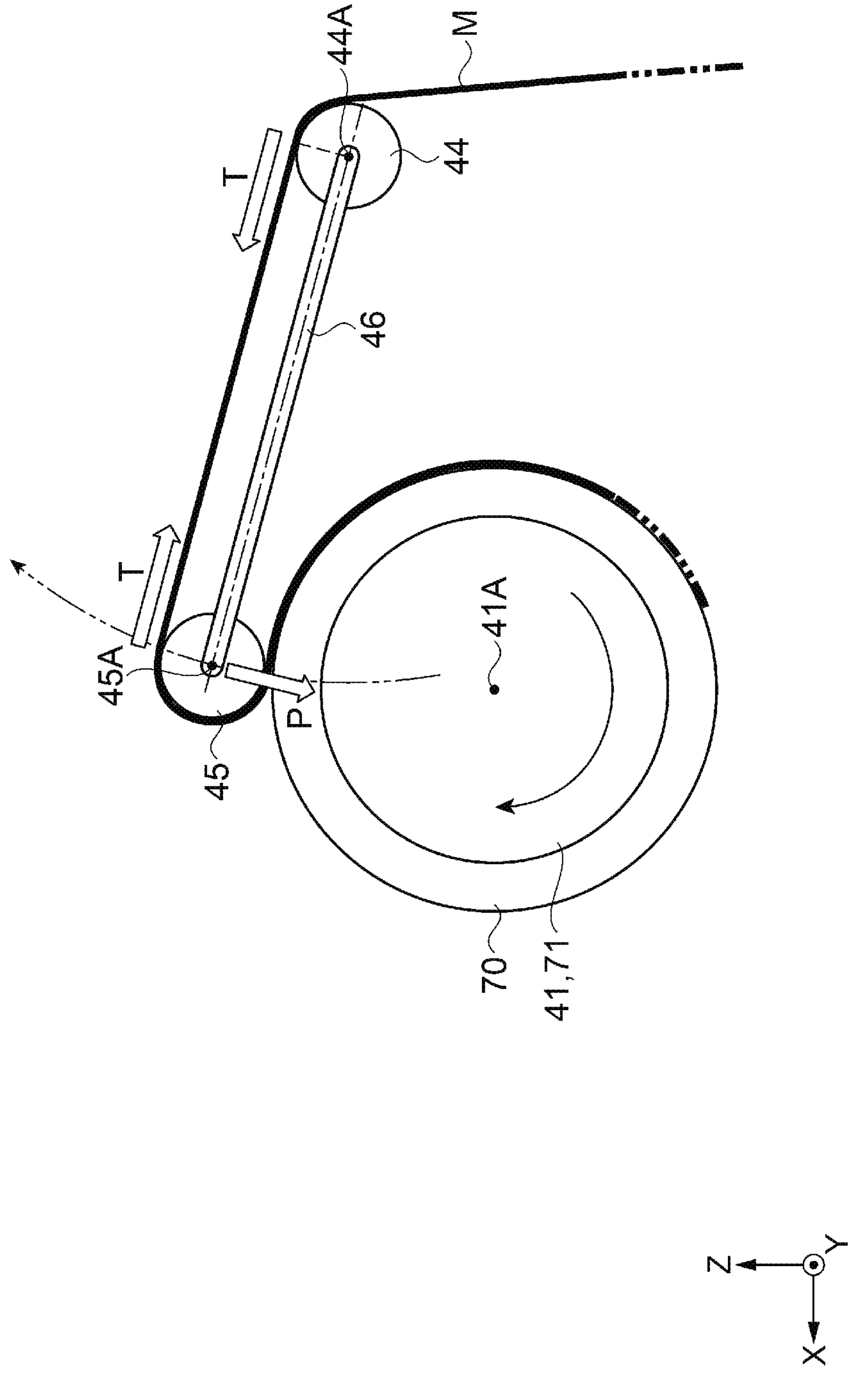
FIG. 7 is an enlarged side view showing a part of the winding unit according to a second modification.
Figure 8:
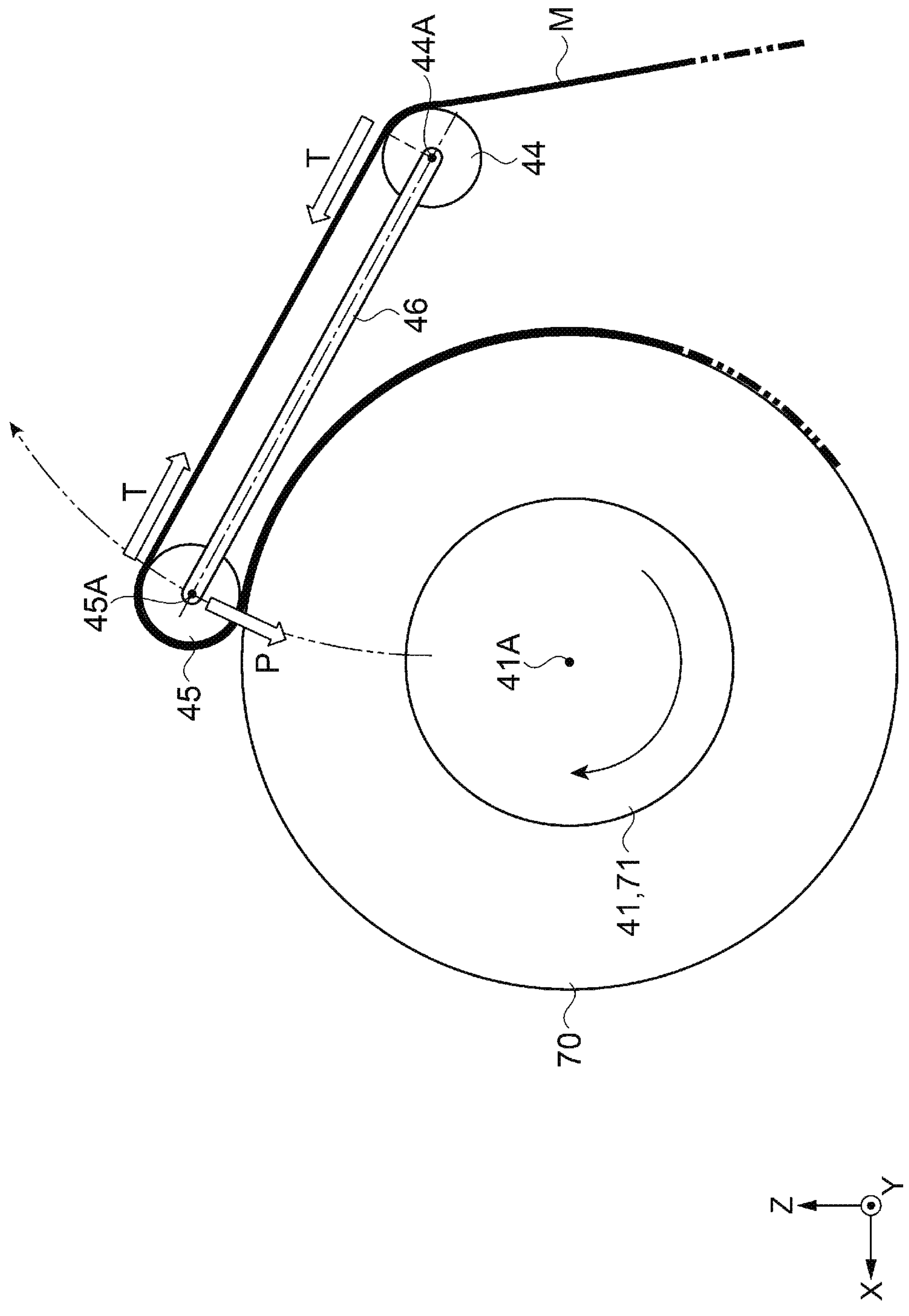
FIG. 8 is an enlarged side view showing the part of the winding unit according to the second modification.

FIGS. 7 and 8 are enlarged side views showing a part of the winding unit 40 according to the second modification, and FIG. 8 shows a state in which the winding progresses more than a state shown in FIG. 7.

As shown in FIGS. 7 and 8, similarly to the first embodiment, among both surfaces of the medium M, the surface that the pressing member 45 contacts is the same as the surface that the winding guide member 44 contacts, and specifically, the pressing member 45 and the winding guide member 44 come into direct or indirect contact with the back surface of the medium M. In the second modification, the diameter of the pressing member 45 is the same as that of the winding guide member 44.

Therefore, the extension direction of the arms 46 in the side view of FIGS. 7 and 8, that is, the direction from the central shaft 44A of the winding guide member 44 toward the central shaft 45A of the pressing member 45, is substantially parallel to the transport direction of the medium M from the winding guide member 44 toward the pressing member 45. In other words, the angle θ between the extension direction of the arms 46 and the transport direction of the medium M is zero. As a result, since a component in the pressing direction of the tension acting on the medium M, that is, a component in the direction perpendicular to the extension direction of the arms 46 is substantially zero, it is possible to further suppress a change in the pressing load P on the medium M by the pressing member 45.

5. Third Modification

Figure 9:
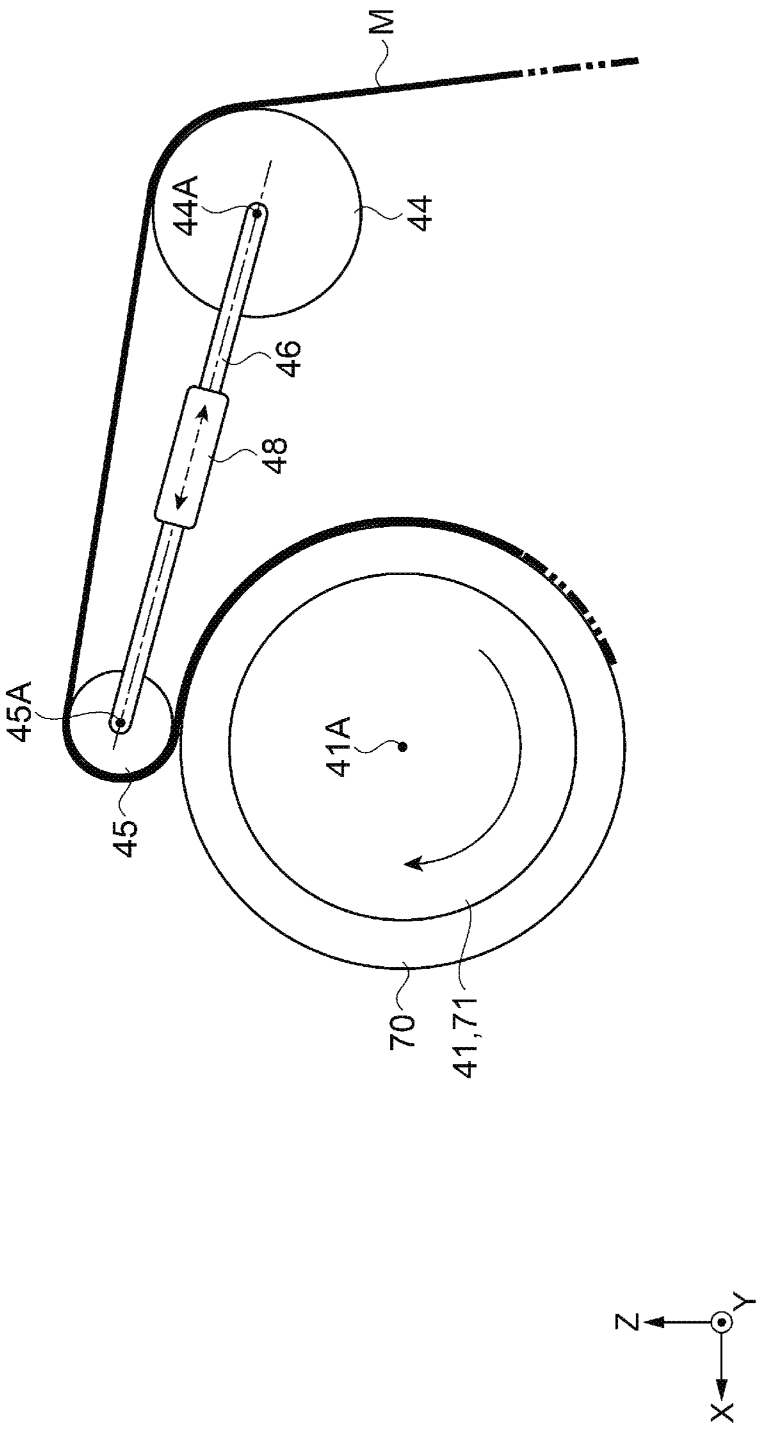
FIG. 9 is an enlarged side view showing a part of the winding unit according to a third modification.

FIG. 9 is an enlarged side view showing a part of the winding unit 40 according to a third modification.

As shown in FIG. 9, the arms 46 are provided with a telescopic mechanism 48 composed of a spring, a damper, or the like substantially at a center in the extension direction. Therefore, the arms 46 can expand and contract in the extension direction. With such a configuration, even when the tension acting on the medium M abruptly changes, it is possible to suppress damage to the medium M by the expansion and contraction of the arms 46. The arms 46 according to the third modification can be applied to both the first embodiment and the second embodiment.

6. Fourth Modification

The winding unit 40 according to a fourth modification has the same configuration as that of the second embodiment, but differs from the second embodiment in that the pressing member 45 is driven to rotate.

Figure 10:
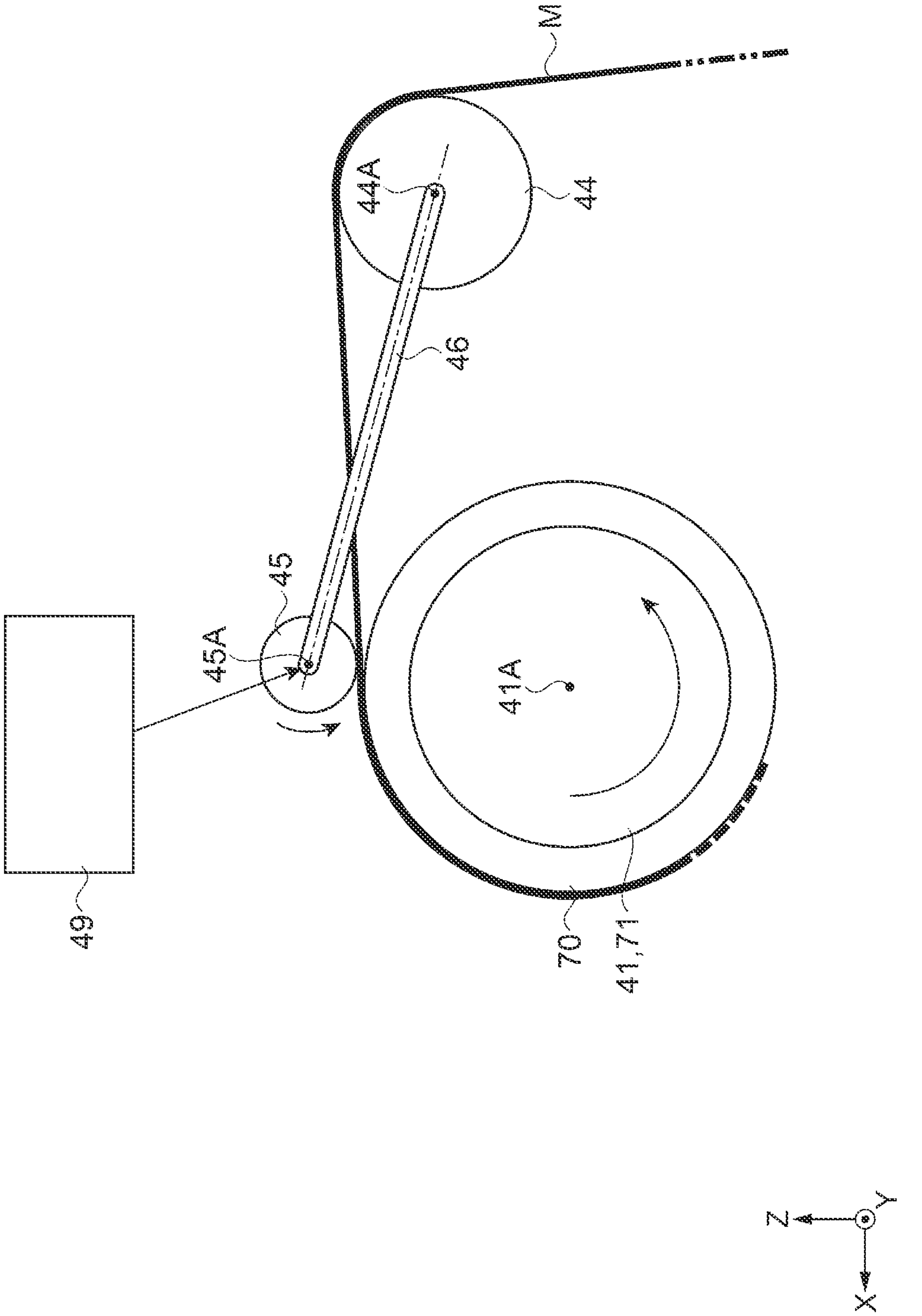
FIG. 10 is an enlarged side view showing a part of the winding unit according to a fourth modification.

FIG. 10 is an enlarged side view showing a part of the winding unit 40 according to the fourth modification.

As shown in FIG. 10, the winding unit 40 includes a rotation drive section 49 that rotates the pressing member 45. Under the control of the control unit 50, the rotation drive section 49 rotationally drives the pressing member 45 so that it rotates about the central shaft 45A. The rotation drive section 49 includes a drive source such as a motor (not shown), a transmission mechanism that transmits a driving force from the drive source, a control circuit that operates the drive source based on a signal from the control unit 50, and the like. The rotation drive section 49 rotates the pressing member 45 in the same direction as a rotation direction of the winding roller 41, that is, in a counterclockwise direction in the side view of FIG. 10. Therefore, a large frictional force acts on the medium M in a direction opposite to the transport direction at the position where the medium M is wound around the winding roller 41, compared to a case where the pressing member 45 rotates clockwise following the transportation of the medium M or a case where the pressing member 45 is not rotatable. As a result, since the tension acting on the medium M to be wound increases, it is possible to suppress air from entering between the layers of the medium M.

7. Fifth Modification

The winding unit 40 according to a fifth modification has the same configuration as that of the second embodiment (see FIGS. 4 and 5), but limitations are added to the configurations of the winding guide member 44 and the pressing member 45. Specifically, in the fifth modification, the winding guide member 44 is not rotatable about its central shaft 44A, and the pressing member 45 is not rotatable about its central shaft 45A. That is, the medium M is transported so as to slide on the outer peripheral surfaces of the winding guide member 44 and the pressing member 45.

In the fifth modification, a coefficient of friction between the medium M and the outer peripheral surface of the pressing member 45 is larger than a coefficient of friction between the medium M and the outer peripheral surface of the winding guide member 44. Therefore, compared to a case where the former coefficient of friction and the latter coefficient of friction are the same or a case where the former coefficient of friction is smaller than the latter coefficient of friction, it is possible to increase the tension that acts on the medium M at the position where the medium M is wound around the winding roller 41. Accordingly, entrance of air between the layers of the medium M is suppressed. Normally, in order to increase the tension, it is necessary to add a mechanism that applies the tension or increase a number of shaft members around which the medium M is wound, such as the winding guide member 44, but according to this configuration, it is possible to suppress addition of a mechanism or an increase in the number of shaft members, and it is possible to simplify the configuration of the winding unit 40. Furthermore, since the number of shaft members is not increased, it is easy to adjust parallelism of the shaft members.

Each of the embodiments described above may be modified as follows.

In the above embodiments, a case where the winding guide member 44 and the pressing member 45 have a cylindrical shape has been described as an example, but the cross-sectional shape may not be circular as long as the change in the pressing load P due to the change in the roll diameter can be suppressed within a range desired by the user. However, when the cross-sectional shape is not circular, the shaft thereof preferably coincides with the center of gravity of the cross-section. In a case where the winding guide member 44 and the pressing member 45 are not rotatable about the central shafts 44A, 45A, respectively, it is desirable that a portion which comes into contact with the medium M has a cylindrical shape. In this case, it may not be cylindrical over the entire circumference. Due to such a shape, it is possible to suppress damage when the winding guide member 44 and the pressing member 45 come into contact with the medium M compared to a case in which the portion which comes into contact with the medium M is not cylindrical. Further, it is more desirable that the entire circumference of the winding guide member 44 is cylindrical. With such a shape, the central shaft 44A of the winding guide member 44 can be easily set, and a configuration of a device can be simplified. In this case, the central shaft 44A of the winding guide member 44 corresponds to a shaft of the guide shaft member, and the diameter of the winding guide member 44 corresponds to the diameter of the guide shaft member. In a case where the portion which comes into contact with the medium M is cylindrical and a portion which does not come into contact with the medium M is not cylindrical, a central shaft of a cylindrical portion corresponds to the shaft of the guide shaft member, and the diameter of the cylindrical portion corresponds to the diameter of the guide shaft member. The same applies to the shaft and diameter of the pressing member 45.

In the above-described embodiment, the case where the winding roller 41 has a cylindrical shape has been exemplified, but it may not have a cylindrical shape as long as it can support and rotate the roll core 71.

In the above-described embodiment, the arms 46 are shown in a linear shape, but a shape of the arms 46 is not limited to a linear shape. However, since the arms 46 are a member that connects the central shaft 44A of the winding guide member 44 and the central shaft 45A of the pressing member 45, regardless of the shape of the arms 46, the direction along the virtual straight line connecting the central shaft 44A of the winding guide member 44 and the central shaft 45A of the pressing member 45 corresponds to the extension direction of the arms 46.

In the above-described embodiment, the arms 46 are connected to the central shaft 44A of the winding guide member 44 and are pivotable about the center shaft 44A, but the arms 46 may be pivotable about a shaft coaxial with the central shaft 44A of the winding guide member 44, that is, may be pivotable about a shaft coaxial with the central shaft 44A as a rotation shaft, and may not be directly connected to the central shaft 44A of the winding guide member 44.

In the above-described embodiment, the winding bar member 43 applies the tension to the medium M wound around it, but the present disclosure is not limited to this configuration. For example, a configuration may be adopted in which tension is applied to the medium M by pressing the medium M with a member that makes line contact or point contact.

In the above-described embodiment, the printer 10 is a device that performs printing on the medium M, and may be a serial printer, a lateral printer, a line printer, a page printer, or the like. A printing method is not limited to an inkjet type, and may be a thermal type, a dot impact type, a laser type, or the like.

In the embodiment described above, a configuration in which the winding unit 40 disposed on the downstream side of the printing unit 20 winds the medium M on which printing has been performed by the printing unit 20 has been described, but the use of the winding unit 40 is not limited thereto. For example, it may be used to form the medium roll 60 mounted on the supply unit 30, that is, the medium roll 60 on which the medium M before printing is wound.

Contents derived from the embodiments will be described below.

A winding device includes a winding roller configured to wind up an elongated medium that was transported; a pressing member that extends along a rotation shaft of the winding roller and that is configured to press the medium toward the winding roller at a position where the medium is wound by the winding roller; a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member.

According to this configuration, since the arm that supports the pressing member, which presses the medium against the winding roller, is pivotable about the shaft that is coaxial with the shaft of the guide shaft member, which guides the medium to the winding roller, even when winding progresses and the roll diameter of the wound medium changes, the angle formed by the extension direction of the arm and the transport direction of the medium from the guide shaft member toward the winding roller is substantially constant. Therefore, among the tensions acting on the medium, the component in the pressing direction, that is, the component in the direction perpendicular to the extension direction of the arm is substantially constant regardless of the roll diameter of the wound medium. As a result, the pressing load on the medium by the pressing member becomes substantially constant, and change in the pressing load due to the change in the roll diameter is suppressed.

It is desirable that according to above-described winding device, among both surfaces of the medium, a surface in contact with the pressing member is the same as a surface in contact with the guide shaft member and a diameter of the pressing member is the same as that of the guide shaft member.

According to this configuration, the surface of the medium that contacts the pressing member is same as the surface that contacts the guide shaft member. In other words, the medium guided from the guide shaft member winds around the pressing member and is pressed against the winding roller by the pressing member. Further, since the diameter of the pressing member is the same as the diameter of the guide shaft member, the extension direction of the arm and the transport direction of the medium from the guide shaft member toward the pressing member are substantially parallel to each other. Therefore, since the component of the tension acting on the medium in the pressing direction, that is, the component in the direction perpendicular to the extension direction of the arm becomes substantially zero, it is possible to further suppress the change in the pressing load on the medium by the pressing member.

It is desirable that according to above-described winding device, the guide shaft member is not rotatable about the shaft of the guide shaft member, the pressing member is not rotatable about a shaft of the pressing member, and a coefficient of friction between the medium and an outer peripheral surface of the pressing member is larger than a coefficient of friction between the medium and an outer peripheral surface of the guide shaft member.

According to this configuration, since the guide shaft member and the pressing member are not rotatable, and the coefficient of friction between the medium and the outer peripheral surface of the pressing member is larger than the coefficient of friction between the medium and the outer peripheral surface of the guide shaft member, it is possible to increase the tension of the medium at the position where the medium is wound around the winding roller compared to a case where both are the same or the former coefficient of friction is smaller than the latter coefficient of friction. Accordingly, entrance of air between the layers of the medium is suppressed. Normally, in order to increase tension, it is necessary to add a mechanism that applies tension or increase the number of shaft members around which the medium winds, such as the guide shaft member, but according to this configuration, it is possible to suppress addition of a mechanism or an increase in the number of shaft members, and it is possible to simplify the configuration of the winding device. Furthermore, since the number of shaft members is not increased, it is easy to adjust parallelism of the shaft members.

It is desirable that according to above-described winding device, on an outer peripheral surface of the pressing member, a first ridge is formed to one side of a substantial center of the pressing member in an axial direction and extends toward the one side in accordance with location downstream in a transport direction and a second ridge is formed to an other side of the substantial center in the axial direction and extends toward the other side in accordance with location downstream in the transport direction.

According to this configuration, since the first ridge is formed on the outer peripheral surface of the pressing member to the one side of the substantial center in the axial direction and the second ridge is formed is formed on the outer peripheral surface of the pressing member to the other side of the substantial center in the axial direction, tension is generated in the medium in a direction in which the ridge extends due to friction with the ridge in a process in which the medium is transported downstream along the pressing member. Since the first ridge extends downstream in one axial direction and the second ridge extends downstream in the other axial direction, tension toward both sides from the substantial center in the axial direction is generated in the medium by being transported while being pressed by the pressing member. Therefore, it is possible to suppress generation of wrinkles in the medium, and in a case where wrinkles are generated, it is possible to correct the wrinkles.

It is desirable that according to above-described winding device, the winding device includes a rotation drive section configured to rotate the pressing member, wherein the rotation drive section rotates the pressing member in the same direction as a direction in which the winding roller rotates.

According to this configuration, since the rotation direction of the winding roller and the rotation direction of the pressing member are the same, a large frictional force acts on the medium in the direction opposite to the transport direction at the position where the medium is wound up on the winding roller, compared to a case where the pressing member rotates in a direction opposite to the winding roller following the transportation of the medium or a case where the pressing member is not rotatable. As a result, since the tension acting on the medium to be wound increases, it is possible to suppress air from entering between the layers of the medium.

It is desirable that according to above-described winding device, the arm is configured to expand and contract in an extension direction of the arm.

According to this configuration, since the arm can expand and contract in the extension direction, even when the tension acting on the medium abruptly changes, it is possible to suppress damage to the medium by the expansion and contraction of the arm.

A printing device includes a print head configured to print on an elongated medium; a winding roller configured to wind the medium after printing; a pressing member that extends along a rotation shaft of the winding roller and that is configured to press the medium toward the winding roller at a position where the medium is wound by the winding roller; a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member.

According to this configuration, since the arm that supports the pressing member, which presses the medium against the winding roller, is pivotable about the shaft that is coaxial with the shaft of the guide shaft member, which guides the medium to the winding roller, even when winding progresses and the roll diameter of the wound medium changes, the angle formed by the extension direction of the arm and the transport direction of the medium from the guide shaft member toward the winding roller is substantially constant. Therefore, among the tensions acting on the medium, the component in the pressing direction, that is, the component in the direction perpendicular to the extension direction of the arm is substantially constant regardless of the roll diameter of the wound medium. As a result, the pressing load on the medium by the pressing member becomes substantially constant, and change in the pressing load due to the change in the roll diameter is suppressed.

What is claimed is:

1. A winding device comprising:

a winding roller configured to wind up an elongated medium that was transported;

a pressing member that extends along a rotation shaft of the winding roller and that is configured to press the medium toward the winding roller at a position where the medium is wound by the winding roller;

a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member, and the arm is configured to expand and contract in an overall length of the arm in an extension direction of the arm.

2. The winding device according to claim 1, wherein among both surfaces of the medium, a surface in contact with the pressing member is the same as a surface in contact with the guide shaft member and a diameter of the pressing member is the same as that of the guide shaft member.

3. The winding device according to claim 1, wherein the guide shaft member is not rotatable about the shaft of the guide shaft member, the pressing member is not rotatable about a shaft of the pressing member, and a coefficient of friction between the medium and an outer peripheral surface of the pressing member is larger than a coefficient of friction between the medium and an outer peripheral surface of the guide shaft member.

4. The winding device according to claim 1, wherein on an outer peripheral surface of the pressing member, a first ridge is formed to one side of a substantial center of the pressing member in an axial direction and extends toward the one side in accordance with location downstream in a transport direction and a second ridge is formed to an other side of the substantial center in the axial direction and extends toward the other side in accordance with location downstream in the transport direction.

5. The winding device according to claim 1, further comprising:

a rotation drive section configured to rotate the pressing member, wherein the rotation drive section rotates the pressing member in the same direction as a direction in which the winding roller rotates.

6. A printing device comprising:

a print head configured to print on an elongated medium;

a winding roller configured to wind the medium after printing;

a pressing member that extends along a rotation shaft of the winding roller and that is configured to press the medium toward the winding roller at a position where the medium is wound by the winding roller;

a guide shaft member that extends along the rotation shaft of the winding roller, that has a fixed position with respect to the winding roller, and that is configured to guide the medium to the winding roller before the medium is wound up by the winding roller; and an arm that extends in a direction intersecting an extension direction of the pressing member and that is configured to support the pressing member, wherein the arm is configured to pivot about a shaft coaxial with a shaft of the guide shaft member, and the arm is configured to expand and contract in an overall length of the arm in an extension direction of the arm.

* * * * *